United States Patent
Sanghvi et al.

(10) Patent No.: US 8,729,815 B2
(45) Date of Patent: May 20, 2014

(54) CURRENT CONTROL SYSTEM

(75) Inventors: Ankit Sanghvi, Danvers, MA (US); Biju Antony, Lynnfield, MA (US); Chaim Becerra, Danvers, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 122 days.

(21) Appl. No.: 13/417,797

(22) Filed: Mar. 12, 2012

(65) Prior Publication Data

US 2013/0234617 A1    Sep. 12, 2013

(51) Int. Cl.
   H05B 37/02       (2006.01)
(52) U.S. Cl.
   USPC ............................ 315/224; 315/291; 323/312
(58) Field of Classification Search
   USPC ........................... 315/224, 225, 291; 323/312
   See application file for complete search history.

(56) References Cited

U.S. PATENT DOCUMENTS

| | | | |
|---|---|---|---|
| 6,153,985 | A | 11/2000 | Grossman |
| 6,987,787 | B1 | 1/2006 | Mick |
| 7,557,518 | B2 | 7/2009 | Zagar et al. |
| 7,671,542 | B2 | 3/2010 | Chang et al. |
| 7,675,245 | B2 | 3/2010 | Szczeszynski et al. |
| 7,800,315 | B2 | 9/2010 | Shteynberg et al. |
| 7,919,936 | B2 | 4/2011 | Liu et al. |
| 7,956,554 | B2 | 6/2011 | Shteynberg et al. |
| 7,999,487 | B2 | 8/2011 | Szczeszynski |
| 8,018,170 | B2 | 9/2011 | Chen et al. |
| 8,035,314 | B2 | 10/2011 | Zhao |
| 8,049,939 | B2 | 11/2011 | Wilms et al. |
| 8,106,604 | B2 | 1/2012 | Zhao et al. |
| 8,159,150 | B2 | 4/2012 | Ashdown et al. |
| 8,169,161 | B2 | 5/2012 | Szczeszynski et al. |
| 8,179,051 | B2 | 5/2012 | Zhao |
| 8,258,709 | B2 | 9/2012 | Moskowitz |
| 8,274,238 | B2 | 9/2012 | Szczeszynski et al. |
| 8,279,144 | B2 | 10/2012 | Zhao et al. |

(Continued)

FOREIGN PATENT DOCUMENTS

| | | |
|---|---|---|
| DE | 103 50 100 A1 | 6/2005 |
| EP | 1 635 617 A2 | 3/2006 |

(Continued)

OTHER PUBLICATIONS

LM3409 / LM3409HV LM3409Q / LM3409QHV PFET Buck Controller for High Power LED Drivers, Literature No. SNVS602H, Apr. 12, 2010, pp. 1-32, National Semiconductor/Texas Instruments, Santa Clara, California/Dallas, Texas.

(Continued)

*Primary Examiner* — Don Le
(74) *Attorney, Agent, or Firm* — Shaun P. Montana (57) ABSTRACT

A current control system, and method for controlling current, and a lighting system including the same, are provided. The current control system includes front end circuitry to receive an input voltage and provide a regulated DC voltage to current source circuitry via a first input voltage terminal. Dimming interface circuitry provides a pulse width modulation signal to conversion circuitry, which uses the pulse width modulation signal to generate an analog voltage. The conversion circuitry sends the analog voltage to the current source circuitry via a second input voltage terminal. The current source circuitry uses the regulated DC voltage and the analog voltage to create an output current. The output current drives a load, which, in the lighting system, is one or more solid state light sources.

14 Claims, 4 Drawing Sheets

(56) References Cited

U.S. PATENT DOCUMENTS

| | | |
|---|---|---|
| 2007/0052375 A1 | 3/2007 | Lin et al. |
| 2007/0115662 A1 | 5/2007 | Roberts et al. |
| 2008/0309255 A1 | 12/2008 | Myers et al. |
| 2009/0251067 A1 | 10/2009 | Johnson |
| 2010/0156315 A1 | 6/2010 | Zhao et al. |
| 2010/0164394 A1 | 7/2010 | Liu |
| 2012/0268037 A1* | 10/2012 | Terazawa ............... 315/307 |
| 2013/0193879 A1* | 8/2013 | Sadwick et al. ............... 315/307 |
| 2013/0234610 A1* | 9/2013 | Terlizzi et al. ............... 315/186 |

FOREIGN PATENT DOCUMENTS

| | | |
|---|---|---|
| WO | 2004/057922 A1 | 7/2004 |
| WO | 2004/057923 A1 | 7/2004 |
| WO | 2006/054230 A1 | 5/2006 |
| WO | 2007/121574 A1 | 11/2007 |
| WO | 2008/025153 A1 | 3/2008 |
| WO | 2009/019655 A2 | 2/2009 |

OTHER PUBLICATIONS

Jon Martis, Closed Loop Chromaticity Control: Interfacing a Digital RGB Color Sensor to a PIC24 MCU, Microchip AN1257, DS01257A, Microchip Technology Inc., 2009.

Xiaohui Qu et al., Color Control System for RGB LED Light Sources Using Junction Temperature Measurement, The 33rd Annual Conference of the IEEE Industrial Electronics Society (IECON), Nov. 5-8, 2007, Taipei, Taiwan.

LED facts and Kelvin Color Temperature Charts, http://autolumination.com/colors.htm.

Jesus Maicas, International Search Report and Written Opinion of the International Searching Authority for PCT/US2012/020882, Apr. 25, 2013, pp. 1-8, European Patent Office, Rijswijk, The Netherlands.

* cited by examiner

CURRENT CONTROL SYSTEM

TECHNICAL FIELD

The present invention relates to power control systems, and more specifically, to power control systems configured to output a constant current to a load based on an input.

BACKGROUND

Electronic technology is rapidly developing to assist in environmental conservation. For example, solid state light source technology, including light emitting diodes (LED), organic light emitting diodes (OLEDs), and the like, are quickly overtaking older lighting technology (e.g., incandescent lighting, fluorescent lighting, etc.) as a preferred source for electronic illumination. Solid state light sources provide, among other things, lower power consumption, minimal heat output, more robust designs, longer life, and lower environmental impact upon disposal. Typical solid state light source-based lighting systems are powered by a power supply that includes circuitry configured to convert alternating current (AC) power (e.g., from a conventional wall socket) or direct current (DC) power (e.g., from a battery) into a voltage level usable by the solid state light sources. The system typically also includes circuitry that uses the power supply provided voltage to generate a current to operate the solid state light sources at a constant light output.

SUMMARY

Conventional techniques for providing constant light output from solid state light sources are generally acceptable for simple lighting applications (e.g., a retrofit lamp including solid state light sources, a solid state light source-based flashlight). However, more complex lighting systems, such as overhead structural lighting systems used in commercial spaces, may necessitate that the light output has a variable intensity. In order to achieve such variable intensity (e.g., dimmable lighting), conventional techniques add dimming interface circuitry to typical solid state light source-based lighting system electronics. This allows the light output from the solid state light sources to be configurable. For example, the dimming interface circuitry may output a variable pulse width modulation signal to the current generation circuitry, which generates an output current based on the signal. The output current may continuously alternate between the peak current level and zero current based on the signal, creating a mean/average current that has the effect of a lower light level to the human eye. While achieving the goal of dimmable light output in a solid state light source-based lighting system, this manner of light output control is very inefficient. It operates on the principle of modulating peak current to create a lower mean/average current, and thus, the lighting system is always operating at the maximum output level.

Embodiments of the present invention provide systems and methods for controlling output from current source circuitry. Dimming interface circuitry is configured to provide a pulse width modulation signal having a variable duty cycle to conversion circuitry. The duty cycle of the pulse width modulation signal varies depending upon an output current desired from the current source circuitry (e.g., based on the desired light output of solid state light sources being supplied by the current source circuitry). The conversion circuitry converts the pulse width modulation signal into an analog voltage. The analog voltage is then supplied to the current source circuitry (e.g., to a controller in the current source circuitry) in order to control the peak current output from the current source circuitry.

In an embodiment, there is provided a current control system. The current control system includes: front end circuitry configured to receive an input voltage and provide a regulated front end direct current (DC) voltage; current source circuitry coupled to the front end circuitry, wherein the current source circuitry comprises a first input voltage terminal and a second input voltage terminal, wherein the current source circuitry is configured to receive the regulated front end DC voltage at the first input voltage terminal and to output a current using the regulated front end DC voltage and based on an input voltage received at the second input voltage terminal; dimming interface circuitry configured to output a pulse width modulation signal; and conversion circuitry coupled to the current source circuitry and the dimming interface circuitry, the conversion circuitry configured to receive the pulse width modulation signal and to output an analog voltage to the input voltage terminal of the current source circuitry, such that the current output by the current source circuitry is based on the output analog voltage of the conversion circuitry.

In a related embodiment, the current source circuitry may include DC-to-DC converter circuitry, the DC-to-DC converter circuitry including a controller configured to cause the DC-to-DC converter circuitry to output a peak current based on an analog voltage monitored at an analog current adjustment input in the controller. In another related embodiment, the conversion circuitry may include a capacitor configured to output the analog voltage based on the received pulse width modulation signal. In a further related embodiment, the conversion circuitry may further include a transistor, wherein the transistor may be configured to cause the capacitor to charge when the pulse width modulation signal is high and wherein the transistor may be configured to cause the capacitor to cease charging when the pulse width modulation signal is low. In a further related embodiment, the conversion circuitry may be further configured to receive a charging voltage, to reduce the charging voltage via two resistors configured as a voltage divider in the conversion circuitry, and to supply the reduced charging voltage to the capacitor through the transistor when the pulse width modulation signal is high.

In yet another related embodiment, the current control system may further include a current driven load coupled to the current source circuitry, wherein the current driven load may be configured to receive the current output. In a further related embodiment, the current drive load may include at least one solid state light source.

In another embodiment, there is provided a lighting system. The lighting system includes: a current driven load; and a current control system, the current control system including: front end circuitry configured to receive an input voltage and provide a regulated front end direct current (DC) voltage; current source circuitry coupled to the front end circuitry, wherein the current source circuitry comprises a first input voltage terminal and a second input voltage terminal, wherein the current source circuitry is configured to receive the regulated front end DC voltage at the first input voltage terminal and to output a current using the regulated front end DC voltage and based on an input voltage received at the second input voltage terminal; dimming interface circuitry configured to output a pulse width modulation signal; and conversion circuitry coupled to the current source circuitry and the dimming interface circuitry, the conversion circuitry configured to receive the pulse width modulation signal and to output an analog voltage to the input voltage terminal of the current source circuitry, such that the current output by the current source circuitry is based on the output analog voltage of the conversion circuitry; wherein the current driven load is configured to receive and be driven by the current output by the current control system.

In a related embodiment, the current source circuitry may include DC-to-DC converter circuitry, the DC-to-DC converter circuitry including a controller configured to cause the DC-to-DC converter circuitry to output a peak current based on an analog voltage monitored at an analog current adjustment input in the controller. In another related embodiment, the conversion circuitry may include a capacitor configured to output the analog voltage based on the received pulse width modulation signal. In a further related embodiment, the conversion circuitry may further include a transistor, wherein the transistor may be configured to cause the capacitor to charge when the pulse width modulation signal is high and wherein the transistor may be configured to cause the capacitor to cease charging when the pulse width modulation signal is low. In a further related embodiment, the conversion circuitry may be further configured to receive a charging voltage, to reduce the charging voltage via two resistors configured as a voltage divider in the conversion circuitry, and to supply the reduced charging voltage to the capacitor through the transistor when the pulse width modulation signal is high.

In yet another related embodiment, the current drive load may include at least one solid state light source.

In another embodiment, there is provided a method of controlling current. The method includes: providing a regulated front end direct current (DC) voltage from an input voltage; generating an analog voltage based on a pulse width modulation signal; and outputting a current using the provided regulated front end DC voltage and based on the generated analog voltage.

In a related embodiment, generating may include: receiving a pulse width modulation signal from dimming interface circuitry; and generating, in conversion circuitry, an analog voltage based on the received pulse width modulation signal. In a further related embodiment, generating may include: charging a capacitor in the conversion circuitry when the received pulse width modulation signal is high; ceasing charging of the capacitor in the conversion circuitry when the received pulse width modulation signal is low; and generating the analog voltage with the charged capacitor. In a further related embodiment, charging may include: causing a transistor in the conversion circuitry to provide a charging voltage to the capacitor when the received pulse width modulation signal is high; and providing the charging voltage to the capacitor when the received pulse width modulation signal is high, so as to charge the capacitor. In a further related embodiment, the method may further include: reducing the charging voltage by voltage divider circuitry in the conversion circuitry, prior to providing the charging voltage to the capacitor.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein control the output of current source circuitry. A lighting system including embodiments disclosed herein includes front end circuitry, current source circuitry, dimming interface circuitry and conversion circuitry. In some embodiments, the front end circuitry supplies a direct current (DC) voltage to at least the current source circuitry. The current source circuitry uses the DC voltage to provide an output current to a load, e.g. one or more solid state light sources, based on an input voltage. The dimming interface circuitry outputs a pulse width modulation (PWM) signal having a variable duty cycle based on, for example, the desired light output of the one or more solid state light sources. The conversion circuitry receives the PWM signal output from the dimming interface circuitry and outputs an analog voltage based on the PWM signal. The analog voltage is provided to the current source circuitry to control the output current to the load (i.e., the one or more solid state light sources).

Figure 1A:
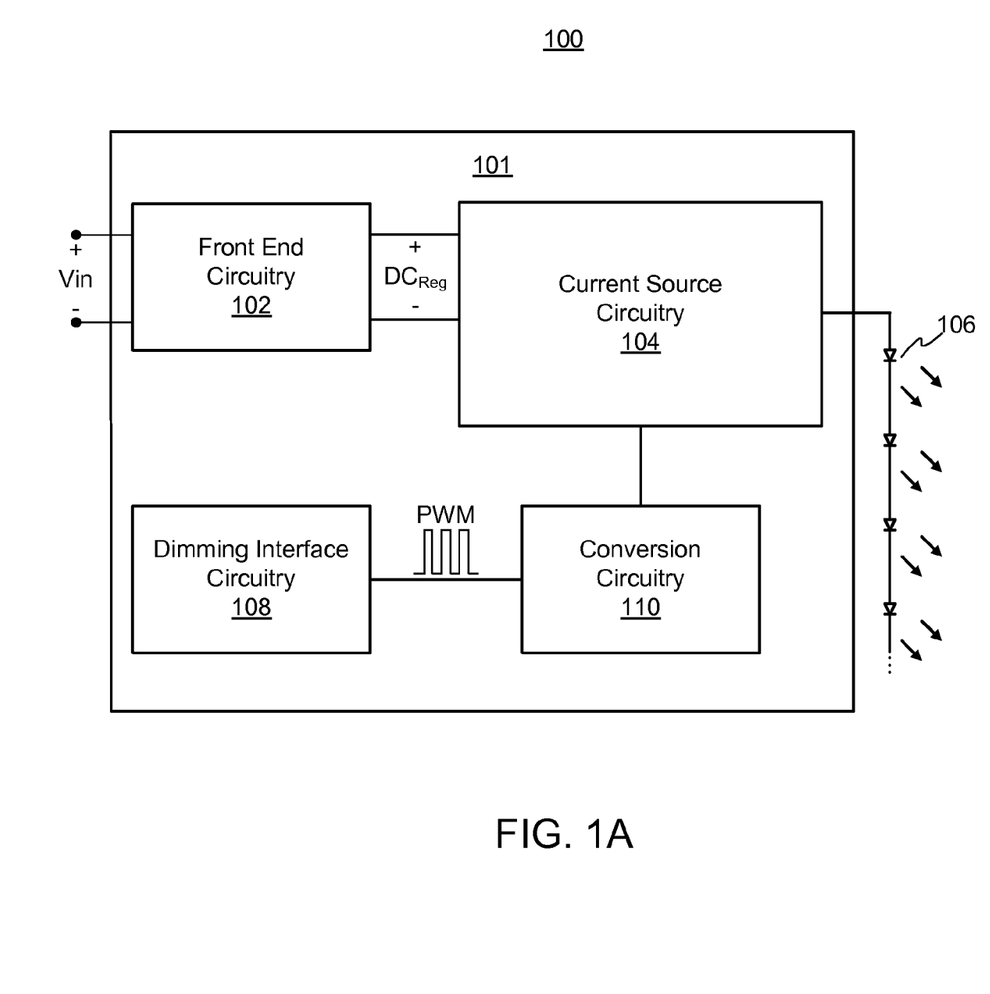
FIG. 1A shows a variable output lighting system including a current control system according to embodiments disclosed herein.

FIG. 1 illustrates a variable output (e.g., dimmable) lighting system 100 (hereinafter the lighting system 100) including a load 106, which in FIG. 1 is shown as one or more solid state light sources 106. The one or more solid state light sources 106 may be, but are not limited to, light emitting diodes (LEDs), organic light emitting diodes (OLEDs), polymer light emitting diodes (PLEDs), and combinations thereof, in either series configurations, parallel configurations, and/or mixtures thereof. The lighting system 100 includes a current control system 101 and the load 106. The current control system 101 includes front end circuitry 102, current source circuitry 104, dimmable interface circuitry 108, and conversion circuitry 110. The front end circuitry 102 includes circuitry that is configured to receive an input voltage ($V_{in}$). The input voltage $V_{in}$ may be provided by any known voltage source. Thus, in some embodiments, the input voltage $V_{in}$ may be an alternating current (AC) input provided directly from a 120 VAC/60 Hz line source. It is to be understood, however, that embodiments may operate using an input voltage provided by other sources, such as but not limited to a 220-240 VAC at 50-60 Hz, a DC source (e.g., a battery), and the like. The front end circuitry 102 is also configured to provide a regulated direct current (DC) output ($DC_{reg}$) to the current source circuitry 104.

In some embodiments, the front end circuitry 102 includes rectifier circuitry configured to receive the input voltage $V_{in}$, switching converter circuitry, and a controller to control a switch in the switching converter circuitry. Various rectifier circuitry configurations are known in the art. For example, in some embodiments, rectifier circuitry may include a diode bridge rectifier, H-bridge rectifier, and the like. The switching converter circuitry receives a rectified AC output from the rectifier circuitry and provides the stable, regulated DC output $DC_{Reg}$ to the current source circuitry 104.

The dimming interface circuitry 108 provides a pulse width modulated signal PWM that the current control system 101 uses to change the current provided to the load 106. In embodiments where the load 106 is one or more solid state light sources, the pulse width modulated signal PWM allows the current control system 101 to adjust the light output by the one or more solid state light sources. In some embodiments, the dimming interface circuitry 108 includes user interface circuitry and pulse width modulation signal generation circuitry (not shown). The user interface circuitry may be, and in some embodiments is, one or more various known user interfaces such as but not limited to buttons, switches, knobs, touch screens, and the like, configured to allow the current control system to be adjusted based on a particular application. For example, when used as part of the lighting system 100, the user interface circuitry may include a conventional dimmer switch that allows a user to set a desired light output level for the one or more solid state light sources. The output of the user interface circuitry may then be used to control the pulse width modulation signal generation circuitry, and thus the pulse width modulated signal PWM generated thereby. For example, the duty cycle (% on time) of the pulse width modulated signal PWM generated by the pulse width modulation generation circuitry may correspond to the setting determined by the user interface circuitry, in that a lower light output setting may cause a lower duty cycle pulse width modulated signal PWM to be generated, while a higher light output setting may cause a higher duty cycle pulse width modulated signal PWM to be generated. The pulse width modulated signal PWM output from the dimming interface circuitry 108 is then provided to the conversion circuitry 110. The conversion circuitry 110 and the current source circuitry 104 are described in greater detail below with regards to FIG. 2.

Figure 1B:
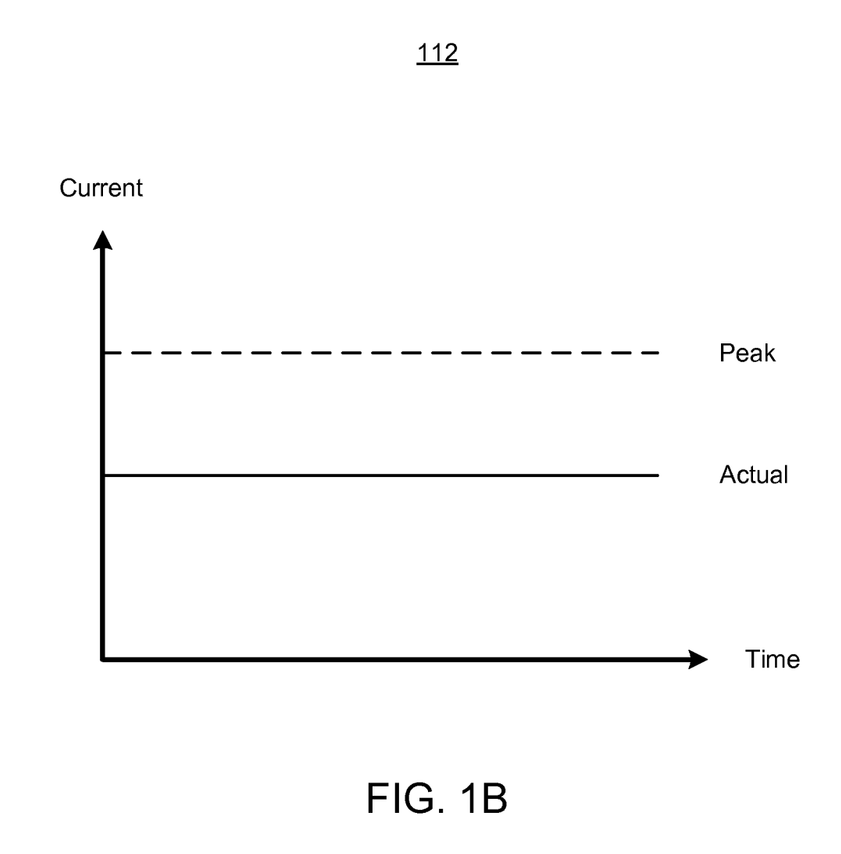
FIG. 1B shows a chart of output current from the current control system of FIG. 1A versus time.

FIG. 1B is a chart 112 that shows an example of the current output by the current control system 101 of FIG. 1A to the load 106. The chart 112 plots output current from the current control system 101 versus time. The plotted dashed line labeled "peak" in the chart 112 describes the maximum output current of the current control system 101. Without introducing any kind of control, the output current to the load 106 is peak. Known control schemes may create a lower mean/average output current by modulating the peak current based on a pulse width modulated signal PWM input into the current source circuitry 104. The resulting output current thus looks like the input pulse width modulated signal PWM, with highs and lows based on the duty cycle of the pulse width modulated signal PWM. While the modulated current is not constant, the result is a lower mean/average current, which causes the one or more solid state light sources 106 to look dimmer to the human eye. However, the disadvantage of this behavior is that the current source circuitry 104 is still generating the maximum output current, which results in a waste of energy. Embodiments address this issue by changing the output of the current source circuitry 104 to generate an output current at a lower level, such as the plotted solid line labeled "actual" in the chart 112. In this manner, the peak output current is reduced to what is actually needed, and thus the lighting system 100 operates in a more energy efficient manner.

Figure 2:
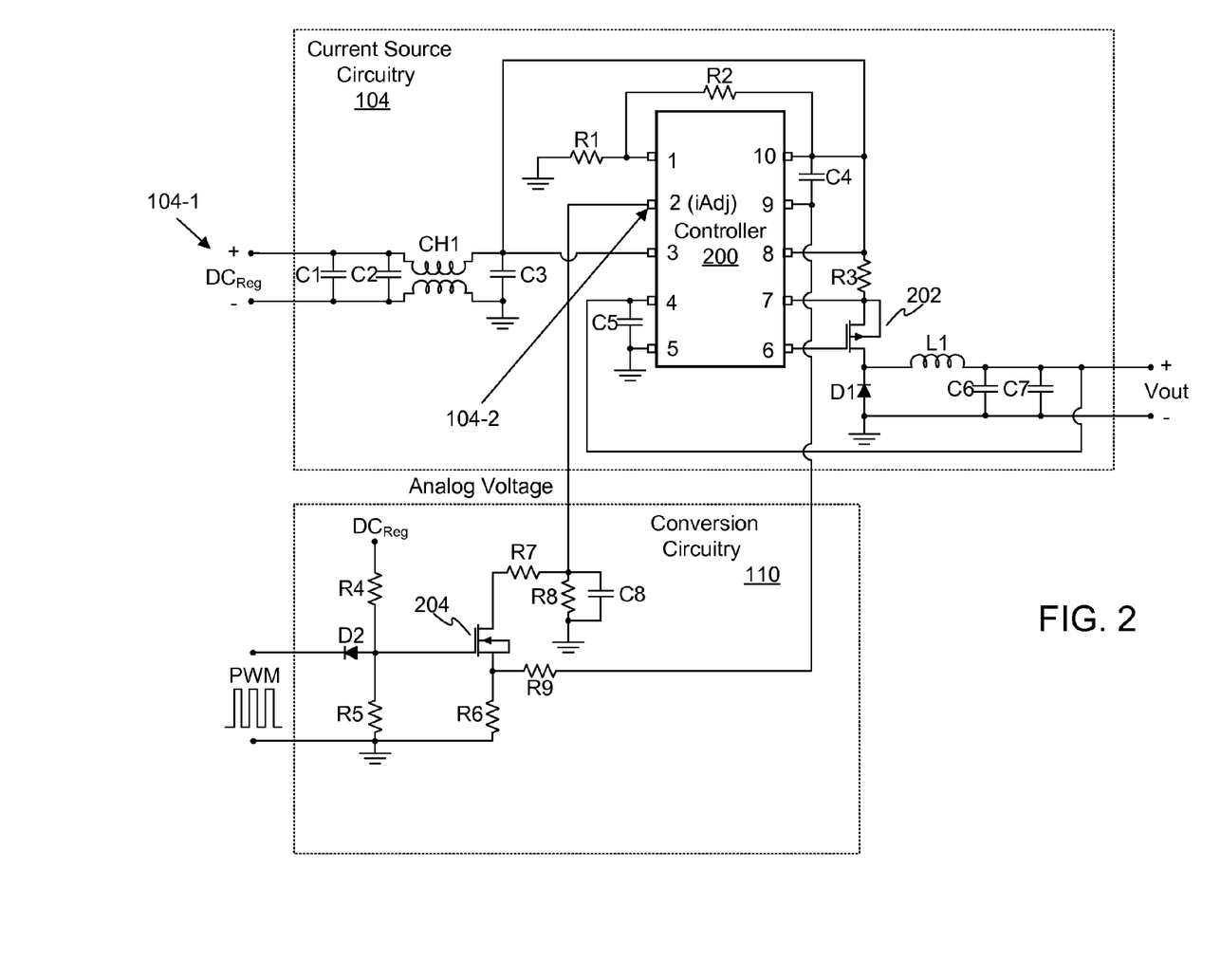
FIG. 2 illustrates a circuit diagram of a portion of a current control system according to embodiments disclosed herein.

FIG. 2 illustrates a circuit diagram including more detail of the current source circuitry 104 and the conversion circuitry 110 each shown in FIG. 1A in block form. The current source circuitry 104 receives an input voltage (such as the input voltage $DC_{Reg}$ from the front end circuitry 102 of FIG. 1A) at a first input voltage terminal 104-1, receives an analog input voltage from the conversion circuitry 110 at a second input voltage terminal 104-2, and provides a constant output current through use of a DC-to-DC converter/conversion topology, as shown in FIG. 2. Examples of known DC-to-DC conversion topologies include, but are not limited to, buck, boost, flyback, inverting, split-pi, SEPIC, half-bridge, full-bridge, and the like. As a DC-to-DC converter is typically driven by a controller, the current source circuitry 104 includes a controller 200. The controller 200 may be, and in some embodiments is, an LM3409 PFET (e.g., P-channel MOSFET) Buck controller manufactured by National Semiconductor. For sake of explanation only, the controller 200 will be described hereinafter as an LM3409 controller (and referred to interchangeably as the controller 200 and the LM3409 controller 200), and thus of course the use of other controllers is also consistent with embodiments.

Various subcircuits may be, and in some embodiments are, built around the controller 200. For example, as shown in FIG. 2, a voltage input subcircuit includes a first capacitor C1, a second capacitor C2, a third capacitor C3, and a choke CH1. In such a voltage input subcircuit, the first capacitor C1 and the second capacitor C2 are arranged in parallel across the first input voltage terminal 104-1, which receives an input voltage (e.g., $DC_{Reg}$ as provided by the front end circuitry 102), and are coupled to the choke CH1 in order to provide electromagnetic interference (EMI) filtering (e.g., to keep EMI from entering the current source circuitry 104). The third capacitor C3 is coupled to the choke CH1 and helps to stabilize the input voltage during any fluctuations. The input voltage is then provided, either from the voltage input subcircuit, another subcircuit having a substantially similar function, or directly from the front end circuitry 102, to pins 3 and 10 of the controller 200. In the LM3409 controller 200, pin 3 is the enable pin, which requires a voltage greater than 1.74V to enable the LM3409 controller 200, and pin 10 is the input voltage for the LM3409 controller 200.

Additional circuitry and/or subcircuits may be required for the LM3409 controller 200 to operate. For example, a voltage divider comprising a first resistor R1 and a second resistor R2 may be used to reduce the input voltage for provision to pin 1, which is the input under-voltage lockout. Pins 9 and 10 may be coupled by a fourth capacitor C4, while pins 4 and 5 may be coupled by a fifth capacitor C5. Pin 9 in the LM3409 controller 200 is the input for the VCC voltage, wherein the fourth capacitor C4 acts as a regulator for a transistor 202 (which, in FIG. 2, is shown as a PFET, with the fourth capacitor C4 acting as a regulator for driving the transistor 202). The fifth capacitor C5 sets the off-time programming at pin 4 by coupling it to the output voltage and a ground, with pin 5 being the ground pin in the LM3409 controller 200. A sense resistor R3 may couple pin 8, the negative current sense in the LM3409 controller 200, and pin 7, the positive current sense in the LM3409 controller 200.

An output subcircuit for the current source circuitry 104 may be, and in some embodiments is, in the form of a buck controller, and includes the transistor 202 (e.g., a p-channel depletion MOSFET), an inductor L1, a diode D1, a sixth capacitor C6, and a seventh capacitor C7. In operation, the controller 200 causes the transistor 202, which is coupled to the sense resistor R3 and pin 6, which is the gate drive in the LM3409 controller 200, to charge the magnetic field of the inductor L1 to provide a particular output current, with the diode D1 being coupled to the input of the inductor L1 to prevent the current from flowing to ground. The sixth capacitor C6 and the seventh capacitor C7 are arranged in parallel across an output terminal Vout in order to stabilize the output current. In particular, if a load connected to Vout (such as the load 106 in FIG. 1A) sees only the inductor L1, the output current may fluctuate more when the output current is adjusted by the controller 200. However, the sixth capacitor C6 and the seventh capacitor C7 are charged by the output current and help to stabilize current flow during transitions.

The conversion circuitry 110, also illustrated in FIG. 2, is configured so that it receives a pulse width modulation signal PWM, for example, from the dimming interface circuitry 108, and after so receiving, outputs an analog voltage based on the received pulse width modulation signal PWM. The analog voltage output from the conversion circuitry 110 is fed to the second input voltage terminal 104-2 of the current source circuitry 104, which in some embodiments (such as is shown in FIG. 2) is pin 2 of the LM3409 controller 200, which is the analog LED current adjustment (iAdj) pin. The iAdj pin may be used to configure the peak current output of the current source circuitry 104. The conversion circuitry 110 may, and in some embodiments does, include a diode D2, resistors R4, R5, R6, R7, R8, and R9, a transistor 204 (e.g., an n-channel depletion MOSFET) having a source, a drain, and a gate, and a capacitor C8. The diode D2 may, and in some embodiments does, operate as reverse voltage protection on the input of the conversion circuitry 110, along with the resistors R4 and R5, which are configured as a voltage divider to reduce the input voltage $DC_{Reg}$ (which is also provided to the conversion circuitry 110) to a lower voltage, to prevent the diode D2 from inadvertently becoming reversed biased. Further, the resistors R6 and R9, also configured as a voltage divider, receive a voltage from pin 10 of the controller 200 (e.g., 6V) and may reduce it to a lower voltage (e.g., 3V) at a source of the transistor 204. During operation, the transistor 204 conducts when the received pulse width modulation signal PWM is high, which then applies the voltage at the source of the transistor 204 (e.g., 3V) to the drain of the transistor 204. The resistors R7 and R8, also configured as a voltage divider, reduce the voltage again before it is applied to the capacitor C8. The voltage applied across the capacitor C8 charges the capacitor C8 to create the analog voltage output from the conversion circuitry 110. The varying duty cycle of the pulse width modulation signal PWM causes the capacitor C8 to charge at different rates, resulting in the analog voltage generated by the capacitor C8 being proportional to the pulse width modulation signal PWM duty cycle. The analog voltage output generated by the conversion circuitry 110 is provided to the controller 200 to control the peak current output from the current source circuitry 104 to the load 106, which may be, as shown in FIG. 1A, one or more solid state light sources 106. In such embodiments, the illumination level (e.g., light output of the one or more solid state light sources 106) is proportional to the duty cycle of the pulse width modulation signal PWM generated by the dimming interface circuitry 108.

Figure 3:
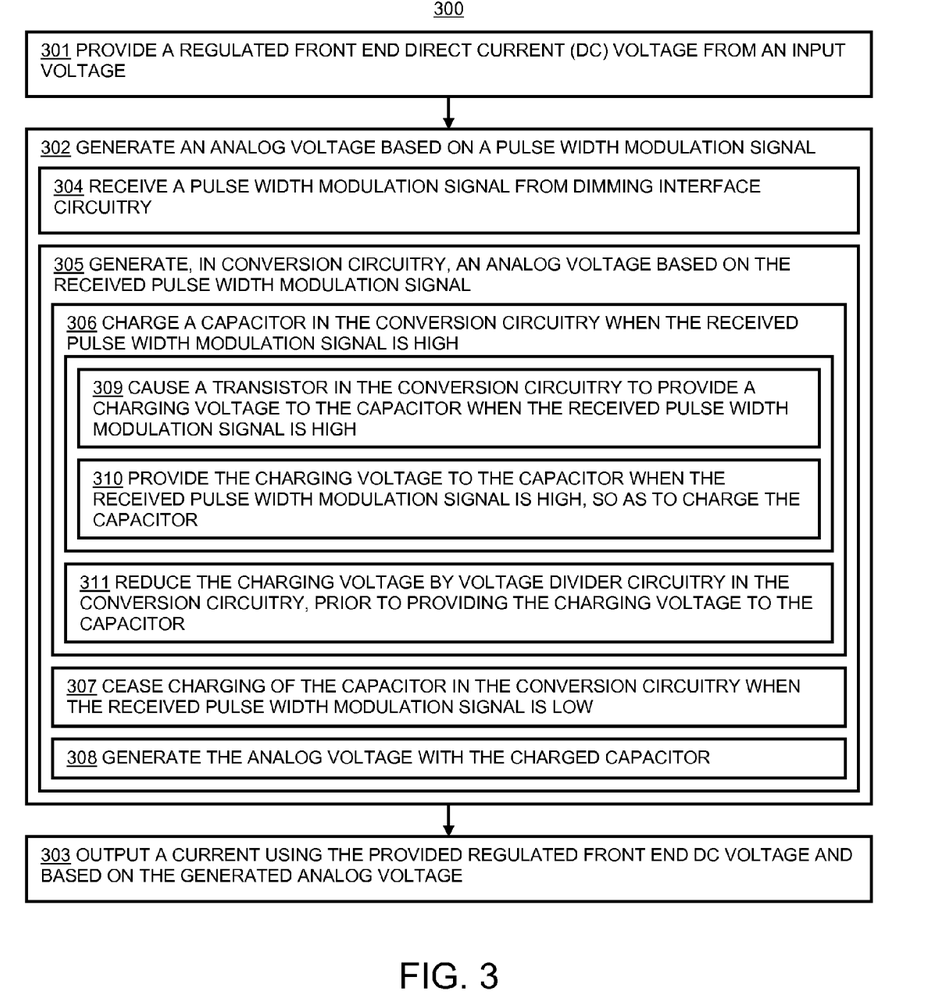
FIG. 3 illustrates a flowchart of a method of controlling current according to embodiments disclosed herein.

FIG. 3 is a flowchart of a method 300 of controlling current. The flowchart illustrates the functional information one of ordinary skill in the art requires to fabricate circuits and/or to generate computer software/firmware to perform the processing required in accordance with embodiments. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Further, while FIG. 3 illustrates various operations, it is to be understood that not all of the operations depicted in FIG. 3 are necessary for other embodiments to function. Indeed, it is fully contemplated herein that in other embodiments of the present disclosure, the operations depicted in FIG. 3, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

More particularly, in the method 300 of FIG. 3, a regulated front end direct current (DC) voltage is provided from an input voltage, step 301. An analog voltage is generated based on a pulse width modulation signal, step 302, and a current is output using the provided regulated front end DC voltage and based on the generated analog voltage, step 303. In some embodiments, when generating an analog voltage, a pulse width modulation signal is received from dimming interface circuitry, step 304, and the analog voltage is generated, in conversion circuitry, based on the received pulse width modulation signal, step 305. In some embodiments, the analog voltage is generated by charging a capacitor in the conversion circuitry when the received pulse width modulation signal is high, step 306, ceasing charging of the capacitor in the conversion circuitry when the received pulse width modulation signal is low, step 307, and generating the analog voltage with the charged capacitor, step 308. In some embodiments, the capacitor is charged by causing a transistor in the conversion circuitry to provide a charging voltage to the capacitor when the received pulse width modulation signal is high, step 309, and providing the charging voltage to the capacitor when the received pulse width modulation signal is high, so as to charge the capacitor, step 310. In some embodiments, the charging voltage is reduced by voltage divider circuitry in the conversion circuitry, prior to providing the charging voltage to the capacitor, step 311.

The methods and systems described herein are not limited to a particular hardware/software/firmware configuration, and may find applicability in many computing or processing environments. The methods and systems may be implemented in hardware or software, or combinations thereof. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, memory chip, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

References to "a microprocessor" and "a processor" and "a controller", or "the microprocessor" and "the processor" and "the controller", may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" or "controller" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

As used in any embodiment herein, a "circuit" or "circuitry" may comprise, for example, singly or in any combination, hardwired circuitry, programmable circuitry, state machine circuitry, and/or firmware that stores instructions executed by programmable circuitry.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A current control system, comprising:
    front end circuitry configured to receive an input voltage and provide a regulated front end direct current (DC) voltage;
    current source circuitry coupled to the front end circuitry, wherein the current source circuitry comprises a first input voltage terminal and a second input voltage terminal, wherein the current source circuitry is configured to receive the regulated front end DC voltage at the first input voltage terminal and to output a current using the regulated front end DC voltage and based on an input voltage received at the second input voltage terminal, wherein the current source circuitry comprises DC-to-DC converter circuitry, the DC-to-DC converter circuitry including a controller configured to cause the DC-to-DC converter circuitry to output a peak current based on an analog voltage monitored at an analog current adjustment input in the controller;
    dimming interface circuitry configured to output a pulse width modulation signal; and
    conversion circuitry coupled to the current source circuitry and the dimming interface circuitry, the conversion circuitry configured to receive the pulse width modulation signal and to output an analog voltage to the input voltage terminal of the current source circuitry, such that the current output by the current source circuitry is based on the output analog voltage of the conversion circuitry.

2. The current control system of claim 1, wherein the conversion circuitry comprises a capacitor configured to output the analog voltage based on the received pulse width modulation signal.

3. The current control system of claim 2, wherein the conversion circuitry further comprises a transistor, wherein the transistor is configured to cause the capacitor to charge when the pulse width modulation signal is high and wherein the transistor is configured to cause the capacitor to cease charging when the pulse width modulation signal is low.

4. The current control system of claim 3, wherein the conversion circuitry is further configured to receive a charging voltage, to reduce the charging voltage via two resistors configured as a voltage divider in the conversion circuitry, and to supply the reduced charging voltage to the capacitor through the transistor when the pulse width modulation signal is high.

5. The current control system of claim 1, further comprising a current driven load coupled to the current source circuitry, wherein the current driven load is configured to receive the current output.

6. The current control system of claim 5, wherein the current drive load comprises at least one solid state light source.

7. A lighting system, comprising:
    a current driven load; and a current control system, the current control system comprising:
- front end circuitry configured to receive an input voltage and provide a regulated front end direct current (DC) voltage;
- current source circuitry coupled to the front end circuitry, wherein the current source circuitry comprises a first input voltage terminal and a second input voltage terminal, wherein the current source circuitry is configured to receive the regulated front end DC voltage at the first input voltage terminal and to output a current using the regulated front end DC voltage and based on an input voltage received at the second input voltage terminal, wherein the current circuitry including a controller configured to cause the DC-to-DC converter circuitry to output a peak current based on an analog voltage monitored at an analog current adjustment input in the controller;
- dimming interface circuitry configured to output a pulse width modulation signal; and
- conversion circuitry coupled to the current source circuitry and the dimming interface circuitry, the conversion circuitry configured to receive the pulse width modulation signal and to output an analog voltage to the input voltage terminal of the current source circuitry, such that the current output by the current source circuitry is based on the output analog voltage of the conversion circuitry;

wherein the current driven load is configured to receive and be driven by the current output by the current control system.

8. The lighting system of claim 7, wherein the conversion circuitry comprises a capacitor configured to output the analog voltage based on the received pulse width modulation signal.

9. The lighting system of claim 8, wherein the conversion circuitry further comprises a transistor, wherein the transistor is configured to cause the capacitor to charge when the pulse width modulation signal is high and wherein the transistor is configured to cause the capacitor to cease charging when the pulse width modulation signal is low.

10. The lighting system of claim 9, wherein the conversion circuitry is further configured to receive a charging voltage, to reduce the charging voltage via two resistors configured as a voltage divider in the conversion circuitry, and to supply the reduced charging voltage to the capacitor through the transistor when the pulse width modulation signal is high.

11. The lighting system of claim 7, wherein the current drive load comprises at least one solid state light source.

12. A method of controlling current, comprising:
- providing a regulated front end direct current (DC) voltage from an input voltage;
- generating an analog voltage based on a pulse width modulation signal; and
- outputting a current using the provided regulated front end DC voltage and based on the generated analog voltage;

wherein generating comprises:
- receiving a pulse width modulation signal from dimming interface circuitry; and
- generating, in conversion circuitry, an analog voltage based on the received pulse width modulation signal, wherein generating comprises:
  - charging a capacitor in the conversion circuitry when the received pulse width modulation signal is high;
  - ceasing charging of the capacitor in the conversion circuitry when the received pulse width modulation signal is low; and
  - generating the analog voltage with the charged capacitor.

13. The method of claim 12, wherein charging comprises:
- causing a transistor in the conversion circuitry to provide a charging voltage to the capacitor when the received pulse width modulation signal is high; and
- providing the charging voltage to the capacitor when the received pulse width modulation signal is high, so as to charge the capacitor.

14. The method of claim 13, further comprising:
- reducing the charging voltage by voltage divider circuitry in the conversion circuitry, prior to providing the charging voltage to the capacitor.

* * * * *